June 22, 1965

G. C. MAYFIELD 3,189,986

METHOD OF KEYING TOGETHER AN ANNULAR PISTON
RING AND A BACK-UP ELEMENT

Filed Nov. 13, 1963

INVENTOR.
GEORGE C. MAYFIELD
BY
Lawrence M. Goodridge
ATTORNEYS

INVENTOR.
GEORGE C. MAYFIELD

United States Patent Office 3,189,986
Patented June 22, 1965

3,189,986
METHOD OF KEYING TOGETHER AN ANNULAR PISTON RING AND A BACK-UP ELEMENT
George C. Mayfield, 8518 Antler Drive, Richmond Heights, Mo.
Filed Nov. 13, 1963, Ser. No. 323,450
7 Claims. (Cl. 29—404)

This invention relates to a method of mating piston ring assemblies and improvements in the use of piston ring assemblies in internal combustion engines and the like; and more specifically to a new manner of operation for all kinds of piston ring assemblies having annular expansible rings, or rails, backed up by an expander-spacer spring ring. In many piston ring assemblies, the force of a spring ring spacer-expander, when compressed between the lands of a piston in a cylinder, is transmitted to the inside periphery of the annular rings, or rails, by tabs extending radially inwardly of the rails and in overlapping engagement with the inner periphery of the rails, all in a manner shown in my prior Patent 3,004,811 of October 17, 1961.

This invention differs from my prior invention by modifications which change the character of the contact of the knife edges on the tabs against the inner periphery of a rail so that after a short period of use (a period of engine "break in") the knife edges cut into the annular expansible ring, or rail, and key the rings (the rails and spacer-expander) against relative rotation. The assembly still retains its full floating non-bottoming action; is rotatable as a unit; and remains expansible and contractible after the keying action is effected. This keying action can take place as the ring becomes mated with the cylinder surface. The relationship between the parts of the ring assembly can become permanent with engine break in, and thereafter the seating relationship between the ring and cylinder, achieved during break in, is not disturbed by changes in position between parts of the ring assembly. In this instance, the improvement results in a new manner of using a piston ring assembly with a piston and cylinder. There is evidence indicating that this improved use provides a seal comparable with other piston ring assemblies under some conditions and vastly superior to these other ring assemblies under most conditions.

There are examples in the prior art of piston ring expanders which index the position of a piston ring with respect to a piston. In some of these examples, the piston ring is incidently indexed in position with respect to the expander spring ring. It is believed, however, that there are no examples in the prior art in which the parts of a piston ring assembly are constructed so as to attain an indexed position with use and it is one of the objects of this invention to provide a piston ring assembly in which wear between the parts thereof produces a fixed indexed position.

In piston ring assemblies, it is important that there be relative movement between the parts to permit compression of the assembly in the ring groove of the piston on insertion into the cylinder. On the other hand, it would be advantageous, if after the piston ring assembly was installed, the parts thereof remained in indexed relative positions. It is an object of this invention to provide a construction for a piston ring assembly with parts capable of relative movement during installation of the piston ring assembly and piston within a cylinder, which assembly, when placed in operation, has interengaging parts operating to establish an indexed position between the ring elements of the assembly.

It is also an object of this invention to provide a method of keying the components of a full floating, non-bottoming piston ring assembly so that a spacer-expander and rail assembly have an indexed relative position during operation in the cylinder.

This invention is applicable to any piston ring assembly having a plurality of interengaging relatively movable, expansible and contractible, spring parts so constructed that the spring action of one part resists any force tending to compress another. The objects of the invention are attained by providing knife edge bearing points between the spring parts and a construction in which normal operation of the ring causes a saw-like action of the knife edges at the bearing points keying the parts together in an indexed position. Before the keying action takes place, the parts of the ring assembly are freely movable one on the other. After the keying action takes place, the parts still remain relatively movable, but are held in indexed relation with respect to one another.

There are many advantages inherent in such a piston ring assembly. The keying action can take place during, or subsequent to, the period of piston ring seating in a cylinder (engine break in period). During initial break in, the ring parts are free to orient themselves so as to equalize tension between ring parts, but are later keyed to prevent displacement. Obviously, the keying in action will gradually reduce initial spring tension between the parts. Accordingly, spring tension will be greater during initial ring seating on the cylinder wall and then gradually diminish to some extent.

At one time, piston rings were pinned to prevent rotation with respect to the piston so that gaps between ring ends of a plurality of rings would stay out of alignment. With the instant invention, the indexed position can accomplish the same result and yet the assembly as a whole be full floating and non-bottoming.

Other objects and advantages of this invention will appear from the following detailed description which is in such clear, concise and exact terms as will enable any person skilled in the art to make and use the same when taken with the accompanying drawings, forming a part thereof, and in which.

Figure 1:
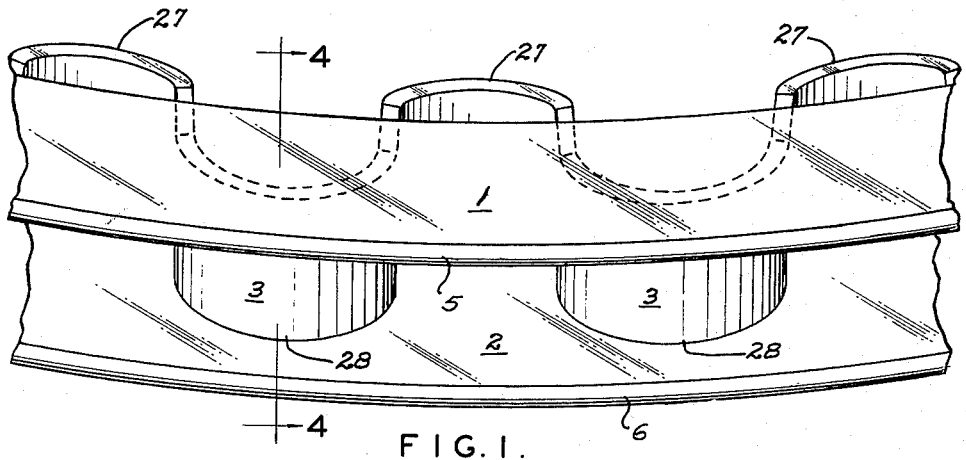
FIG. 1 is a fragmentary view in perspective of a piston ring assembly constructed in accordance with this invention.

Referring to FIG. 1, a pair of split C-shaped rails 1 and 2 are held in spaced superposed relation by a spacer-expander spring ring 3. Rails 1 and 2 are expansible and contractible metal rings with outer peripheries 5 and 6 disposed to engage a cylinder wall. Spacer-expander ring 3 is a flexible, expansible and contractible spring ring formed of a corrugated strip of metal. Opposite ends of the ring 3 are disposed in abutting relation so as to form a circumferentially compressible spring ring.

Figure 2:
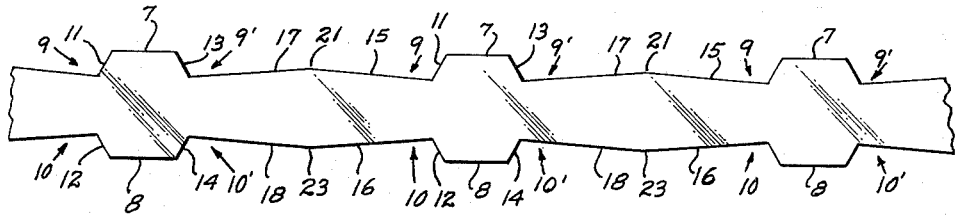
FIG. 2 is a plan view of a blanked out strip of spring metal from which the spacer-expander shown in FIG. 1 is constructed.

Ring 3 is made from a plane ribbon strip of spring metal blanked out as shown in FIG. 2. The blanking operation is performed by dies of suitable configuration to leave pairs of oppositely located tabs 7 and 8 at the top and bottom edges of the strip respectively. Each pair of tabs 7 and 8 is defined by triangular shaped cutouts 9 and 10 on one side and 9' and 10' on the opposite side. Preferably, the cutouts are such as to leave edges 11 and 13 on tab 7 and 12 and 14 on tab 8 inclined in opposite directions but at the same angle to the edges of the strip. In other words, the edges 12 and 13 are parallel and edges 11 and 14 are parallel. This invention could also be realized by having the edges 11, 13, 12 and 14 at right angles to the edges of the strip.

Cutouts 9 and 9' also form the inclined edges 15 and 17, respectively, while cutouts 10 and 10' form edges 16 and 18, respectively. Where the edges 15 and 17 meet, there is a point 21, and where edges 16 and 18 meet, there is a point 23. Because both sides of the blanked out strip are the same and exactly opposite in configuration and alignment, it can be aptly classified at regular and symmetrical. As this description proceeds, it will be understood that in this respect other classes are equally applicable to this invention.

When the blanked out strip, shown in FIG. 2, is subsequently corrugated, it becomes spacer-expander 3 as shown in FIG. 1. Tab 7 lies radially inwardly of the inner periphery of the top rail 1 and is arcuate in shape so the knife edge, or edges, 11' at the edges 11 and the knife edges 13' at the edges 13 on opposite sides of the tab 7 are in contact with the inside of top rail 1. Likewise, tab 8 lies radially inwardly of the inner periphery of the bottom rail 2 and is also arcuate in shape so that knife edges 12' at the edges 12 and knife edges 14' at the edges 14 on opposite sides of the tab 8 are in contact with the inside of the bottom rail 2, as shown better in FIGS. 4 and 5. The tabs 7 and 8, as will be seen from FIG. 1, lie along the crest of inner humps 27 and the points 21 and 23 lie along the crest of the outer humps 28 so that points 21 and 23 become the spacers lying between the rails 1 and 2 forming fulcrum points on which the rails 1 and 2 can dish slightly depending upon the depth of the cutouts 9, 9' and 10, 10'.

Figure 3:
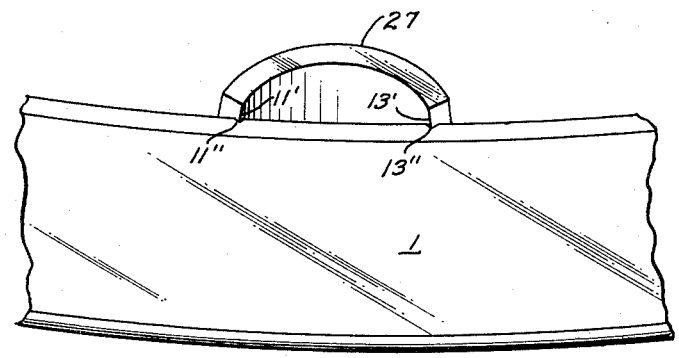
FIG. 3 is a fragmentary view in perspective illustrating the keying in action of the interengaging surfaces between the spacer-expander and a piston ring, or rail.
Figure 4:
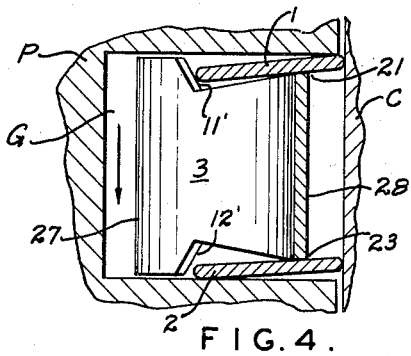
FIG. 4 is a transverse section taken on the line 4—4 of FIG. 1 illustrating on an exaggereted scale the action of the piston ring rails during the down stroke of the piston in a cylinder.
Figure 5:
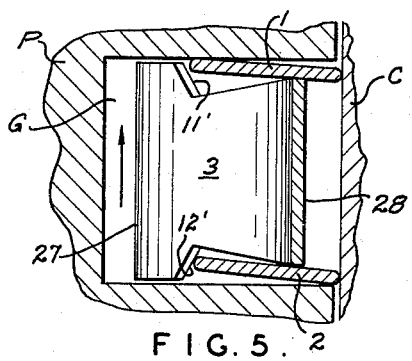
FIG. 5 is a transverse section taken on the line 4—4 of FIG. 1 illustrating in an exaggereated manner the action of the parts of the piston ring during the up stroke of the piston.

The interengagement between parts of the piston ring assembly is explained with reference to the schematic operational views in FIGS. 4 and 5. Actually, this interengagement between parts of the ring assembly amounts to point contact, and this is true not only of the engagement between the rounded inner periphery of rail 1 with knife edges 11' and 13' and the rounded inner periphery of rail 2 with knife edges 12' and 14', but also true of the engagement between fulcrum points 21 and 23 with the inner face of each of the rails 1 and 2. Point engagement provides minimum friction between the parts as the assembly expands and contracts within a cylinder. Consequently, when the piston ring assembly is mounted in the piston groove G of the piston P and the piston P reciprocates within the cylinder C, the piston ring assembly is free to float within the groove, or expand or contract, to accommodate irregularities in the cylinder wall. As the parts wear in, the tool marks in the cylinder wall smooth out and thereafter the piston rings find their seat. This all occurs during the so-called break in of the engine. During this period, a new or rebored cylinder C becomes more or less uniform in size from top to bottom so that the amount of expansion and contraction of the piston ring assembly decreases and thereafter it is only necessary for the parts to expand to compensate for ring, or cylinder, wear. In other words, it is no longer necessary to have friction free circumferential engagement between the inner peripheries of the rails 1 and 2 and the knife edges of the spacer-expander ring 3. After the rings are seated in the cylinder C, it would be preferable if the rings were held against any relative rotation between the several parts. In order to accomplish this keying in to prevent the relative rotation, the spacer-expander ring 3 is provided with suitable clearances at the edges 15, 16, 17 and 18 so that the rails 1 and 2 may rock or dish as the piston P reciprocates in the cylinder C. This action is illustrated in FIGS. 4 and 5. In FIG. 4, the piston P is on the down stroke and the outer peripheries of the rails raised and the inner peripheries depressed. On the up stroke of the piston as shown in FIG. 5, the reverse action occurs. This rocking or dishing or the rails 1 and 2 produces a saw-like action between the knife edges 11' and 13' on the inner periphery of the rail 1 and the knife edges 12' and 14' on the inner periphery of the rail 2. Besides the dishing effect, there is likewise wear due to rapid flexing of the rails as they change diameter on piston reciprocation. As a result, the knife edges wear into the rails forming the notches, such as shown on enlarged scale in FIG. 3. The notches 11" and 13" slide upon the knife edges 11' and 13', but the notches prevent rotation of the rail 1 with respect to the spacer-expander ring 3. It will be understood that the same notching action occurs on the bottom rail 2, thus keying the parts in an indexed position with respect to one another and holding the parts against relative rotation.

In the above-described embodiments, the spacer-expander spring is formed by corrugating a blanked out strip of spring metal of a regular, symmetrical pattern of which FIG. 2 illustrates one example. In this pattern, the knife edges can be either vertical, or inclined to the vertical, as illustrated. Other patterns differing from these examples, but which operate in the same way, are contemplated. Some of these are illustrated in FIGS. 6–9, inclusive, which will be described by pointing out the differences in these patterns from that of the regular symmetrical pattern, one example of which is described above in FIG. 2.

Figure 6:
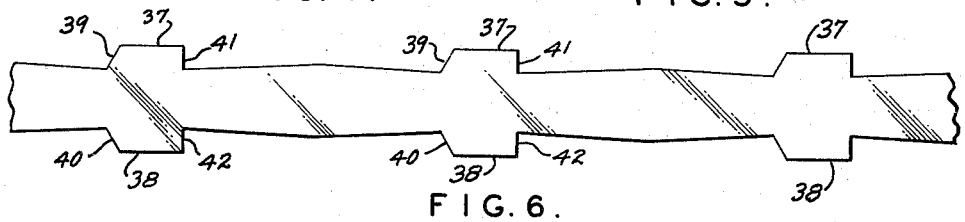
FIGS. 6–9 are plan views of blanked out strips of spring metal which, in corrugated form can be used with a pair of rails to carry out this invention.

In FIG. 6, a strip of uniform width is blanked out by dies which cut triangular notches in opposite edges of the strip leaving tabs 37 at one edge and 38 at the opposite edge. Unlike the previously described blanks however, tabs 37 have one inclined edge 39 and one edge 41 at right angles to the length of the strip. Tabs 38 are similar, with an inclined edge 40 opposite edge 39, and an edge 42 at right angles to the strip and opposite edge 41. Now, this strip may be corrugated with the tabs located on the inner humps so that all of the inclined edges 39 and 40 have knife edge engagement with the piston rings, or rails, or, with the tabs located on the inner humps so that all the right angular edges 41 and 42 have knife edge engagement with the piston rings, or rails. The inclined edges 39 and 40 woud not necessarily engage simultaneously with the right angular edges 41 and 42. In either case, the basic pattern for this strip can be termed, or classed as, irregular symmetrical, with consecutive duplicates. The corrugated strip of this pattern performs a spring type spacer-expander in which either the inclined edges 39 and 40 cut into the rails to form the indexed relation, or the edges 41 and 42 cut into the edges of the rails to form the indexed position depending on the location of the tabs on the humps. Regardless of the pattern, the action of the knife edges is the same as above described in FIGS. 4 and 5.

Figure 7:
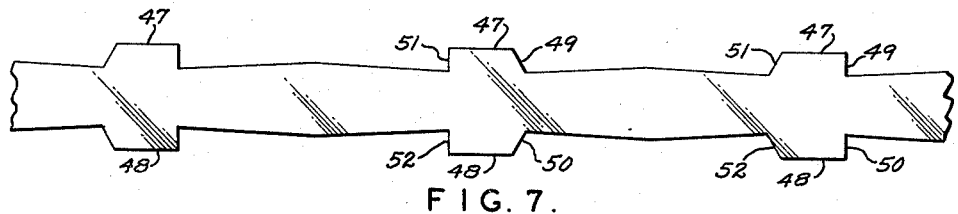

In FIG. 7, a strip of uniform width is blanked out by dies which cut triangular notches in opposite edges leaving tabs 47 at one edge and 48 at the opposite edge. Unlike the blank pattern described in FIG. 6 however, the inclined edges 49 and 50 and the right angular edges 51 and 52 are reversed in position from one pair of tabs to the next. This locates the right angular edges 51 and 52 on adjacent tabs in opposed positions and the inclined edges 49 and 50 on adjacent tabs opposite in an alternating manner. Again, this strip may be corrugated with tabs located on the inner humps so that either all of the inclined edges 49 and 50 have knife edge engagement with the piston rings, or rails, or with the tabs located on the inner humps so that the right angular edges 51 and 52 have knife edge engagement with the piston rings, or rails. In either case, the basic pattern for this strip can be termed, or classed as, irregular, symmetrical, consecutive opposites. Regardless of how the tabs are oriented with respect to the inner humps, the operation of a corrugated spring-expander formed from a strip of this particular class of patterns operates as described in FIGS. 4 and 5.

Figure 8:
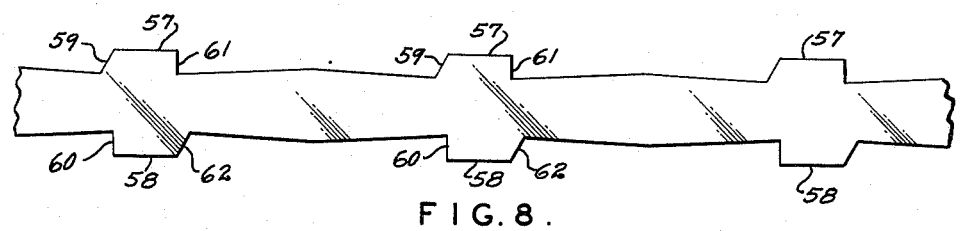

In FIG. 8, a strip of uniform width is blanked out by dies which cut triangular notches in opposite edges leaving tabs 57 along one edge and 58 along the opposite edge. Unlike the patterns heretofore described in FIGS. 6 and 7 however, tab 57 has an inclined edge 59 opposite a right angular edge 60 on a tab 58, and the tab 58 has an inclined edge 62 opposite a right angular located edge 61 on the tab 57. Again, this strip may be corrugated with the tabs located on the inner humps so that all of the inclined edges 59 and 62 have knife edge engagement with the piston rings, or rails, or with the tabs located on the inner humps so that all of the right angular edges 60 and 61 have knife edge engagement with the piston rings, or rails. The inclined and right angular edges would not necessarily engage simultaneously. In either case, the basic pattern for this strip can be termed, or classed as, irregular, non-symmetrical, with consecutive duplicates. A corrugated spacer-expander ring formed from the pattern, shown in FIG. 8, will operate in exactly the same way to index the ring position, all as described in FIGS. 4 and 5.

Figure 9:
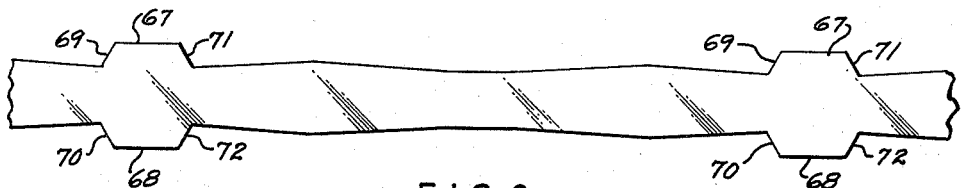

The pattern shown in FIG. 9 is similar to the pattern shown in FIG. 2, except that some of the tabs have been eliminated so that the spacing of the tabs differs from FIG. 2. In this modification, the tabs 67 and 68 have opposite inclined edges 69, 71 and 70, 72. When the strip is corrugated, every other inner hump will have a pair of tabs 67 and 68. Inclined edges 69 and 71 will have knife edge engagement with the inner periphery of a piston ring, or rail and inclined edges 70 and 72 will have a knife edge engagement with the inner periphery of a piston ring or rail. The pattern for this strip can be termed, or classed as, regular, symmetrical, non-consecutive duplicates.

From the above description, it will be realized that the invention can be carried out by various types of spacer-expanders constructed of strips of various regular, or irregular, patterns. As long as the engagement between the parts of the assembly is of the character of point contact, the movement between parts is relatively frictionless and the parts are free to move between adjacent lands of the piston to equalize contact pressure between rings as the spacer-expander expands and contracts circumferentially like a spring during installation. After the ring wears in or finds its seat on the cylinder wall, the ridge-like surfaces of the cylinder left by the machine operations disappear. Thereafter, the amount of movement of the spacer-expander on the rails due to circumferential spring action in the spacer-expander becomes negligible.

In all of the modifications described, the notches formed in the rails provide a pattern permitting some rocking or dishing of the rails on the spacer-expander as the piston reciprocates in the cylinder. This small degree of rocking provided will permit the saw-like action of the knife edges which is instrumental in forming the notches and causing the parts of the piston ring assembly to become fixed in a particular indexed position. Since the notch forming operation depends in part upon the pressure between contact points in the parts of the ring assembly, the variation in the number of contact points can directly affect the rate in which the notches are formed provided spring pressure in the spacer-expander ring is uniform. In other words, for a given set of conditions, decreasing the number of contact points would accelerate the notch forming and vice versa. Ordinarily, it would be desirable to have the parts of the piston ring fixed in index position subsequent to the break in period. By experiment, the proper number of contact points between parts of the piston ring assembly can be varied in any one of the ways above described so as to achieve the desired indexing at the proper time for a predetermined contact pressure between the parts of the piston ring assembly.

Changes in and modifications of the construction described may be made without departing from the spirit of my invention or sacrificing its advantages.

Having thus described the invention, what is claimed and desired to be secured by Letters Patent is:

1. The method of keying together an annular cylinder-engaging piston ring and a back-up element for delivering an expansive force to said ring, said method comprising,
   (a) providing said back-up element with a series of knife edge bearing points to engage the inner periphery of said piston ring and transmit expansive forces thereto, said knife edge bearing points being more resistant to wear against said inner periphery than the latter is resistant to wear against the former,
   (b) mounting said piston ring and said backup element in a piston ring groove with said knife edge bearing points in engagement with the inner periphery of said ring, said ring having sufficient clearance to permit axial movement of the inner periphery of the ring relative to said knife edges within said groove,
   (c) assembling said piston within a cylinder,
   (d) and operating said piston in said cylinder until the knife edges have worn notches in the inner periphery of the ring to a depth sufficient to restrain relative circumferential movement between said ring and said back-up element during normal operation of said piston in said cylinder.

2. The method of claim 1 wherein said back-up element is sinuous, a major portion thereof is disposed between two axially spaced piston rings, and has knife edge bearing points with both of said rings.

3. The method of claim 2 wherein circumferentially successive knife edge bearing points on one of said rings are circumferentially spaced apart substantially more than 180° of sinuosity.

4. The method of claim 2 wherein circumferentially successive knife edge bearing points on one of said rings are circumferentially spaced apart at least about 360° of sinuosity.

5. A piston ring set comprising a cylinder-engaging ring and a sinuous back-up element for delivering expansive forces to said ring, said back-up element having a series of circumferentially spaced knife edge bearing points engaging the inner periphery of said ring, and said knife edge bearing points being more resistant to wear against said inner periphery than the latter is to the former.

6. The piston ring set of claim 5 having a pair of cylinder-engaging rings axially spaced by said sinuous back-up member, said back-up member having its knife edge bearing points projecting axially from the portion thereof between said rings into engagement with the inner peripheries of said rings respectively, and said knife edge bearing points which engage one of said rings being circumferentially spaced more than 180° of sinuosity.

7. The piston ring set of claim 6 wherein the circumferential spacing of said knife edge bearing points is at least about 360° of sinuosity.

References Cited by the Examiner
UNITED STATES PATENTS
3,004,811   10/61   Mayfield _____ 277—139

WHITMORE A. WILTZ, *Primary Examiner.*

THOMAS H. EAGER, *Examiner.*